US008712073B2

(12) United States Patent
Lee et al.

(10) Patent No.: US 8,712,073 B2
(45) Date of Patent: Apr. 29, 2014

(54) METHOD AND APPARATUS FOR BLIND SIGNAL EXTRACTION

(75) Inventors: Soo-Young Lee, Daejeon (KR); Jae-Kwon Yoo, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 306 days.

(21) Appl. No.: 13/327,889

(22) Filed: Dec. 16, 2011

(65) Prior Publication Data

US 2013/0156222 A1 Jun. 20, 2013

(51) Int. Cl.
*H04B 15/00* (2006.01)

(52) U.S. Cl.
USPC ............. 381/93; 381/94.1; 381/94.7; 381/17; 381/56; 381/119

(58) Field of Classification Search
USPC ........... 381/93, 94.1, 94.2, 94.7, 17, 56, 71.1, 381/119
See application file for complete search history.

(56) References Cited

PUBLICATIONS

Jae-Kwon Yoo et al., "Blind Source Extraction Using Closest Constraint", IEEE Signal Processing Letters, Oct. 2009.*
W. Liu et al., "Blind source extraction based on a linear predictor", IET Signal Process., 2007, 1, (1), pp. 29-34.

* cited by examiner

*Primary Examiner* — Vivian Chin
*Assistant Examiner* — Paul Kim
(74) *Attorney, Agent, or Firm* — Hamilton DeSanctis & Cha

(57) ABSTRACT

An apparatus for extracting a signal from convolutive mixtures includes a receiving unit which includes two or more receivers and receives a signal; a transfer function calculation unit which calculates transfer functions for demixing; and a demixing unit which demixes the received signal using the calculated transfer functions. The transfer function is determined such that a signal is extracted from a source closest to the receivers, and is calculated on the basis of a transfer function for a path to each receiver being approximated to a delta function as closer to the source.

20 Claims, 6 Drawing Sheets

METHOD AND APPARATUS FOR BLIND SIGNAL EXTRACTION

FIELD OF THE INVENTION

The present invention is a technique for signal extraction, and in particular, to a method and apparatus for extracting a blind signal from convolutive mixtures using a direction constraint or closest constraint.

BACKGROUND OF THE INVENTION

When receiving a signal, such as voice, the signal may be a signal in which signals generated from two or more different sources are mixed. Accordingly, it is necessary to separate or extract only a signal from a desired source from the signal in which signals from two or more sources are mixed. To this end, a blind signal separation (BSS) method and a blind source extraction (BSE) method are known.

In accordance with to the BBS method, signals from two or more sources are separated to separately acquire a signal from each source. However, in the BSS method, a signal from an undesired source, for example, noise is separated, causing an unnecessary increase in the amount of computation, an increase in time of computation, and complexity in circuit configuration.

On the other hand, in accordance with the BSE method, only a signal from a desired source is extracted from signals. However, unless a source to be selected is not defined, uncertainty inevitably occurs. In other words, when only a signal from one source is selectively extracted in a state where an accurate reference is not provided, it may be difficult to ensure that an extracted signal is a desired signal.

A BSE method is also known in which a reference signal is acquired, and one signal is extracted on the basis of the reference signal. In this method, however, there is a problem, in that an additional arithmetic operation is required so as to acquire the reference signal.

SUMMARY OF THE INVENTION

Some embodiments of the present invention provide methods and apparatus for extracting a signal from mixtures capable of efficiently extracting one desired signal. In some instances of the aforementioned embodiments, there is provided an apparatus for extracting a signal from convolutive mixtures, the apparatus includes:

a receiving unit which includes two or more receivers and receives a convolutively-mixed signal;

a transfer function calculation unit which calculates a transfer function for demixing; and a demixing unit which demixes the received convolutively-mixed signal using the calculated transfer functions, wherein the transfer function is determined such that a signal is extracted from a source closest to the receivers, and is calculated on the basis of a transfer function for a path to each receiver being approximated to a delta function as closer to the source.

In other instances of the aforementioned embodiments, there is provided a method of extracting a signal by blind signal extraction, the method comprising:

receiving a convolutively-mixed signal through two or more receivers;

calculating a transfer function for demixing; and demixing the received convolutively-mixed signal using the calculated transfer function, wherein the transfer function is determined such that a signal is extracted from a source closest to the receivers, and is calculated on the basis of a transfer function for a path to each receiver being approximated to a delta function as closer to the source.

In one or more instances of the aforementioned embodiments, here is provided an apparatus for extracting a signal from convolutive mixtures, the apparatus comprising:

a receiving unit which includes two or more receivers and receives a convolutively-mixed signal;

a transfer function calculation unit which calculates a transfer function for demixing; and a demixing unit which demixes the received convolutively-mixed signal using the calculated transfer function, wherein the transfer function is determined such that a signal from a source in a known direction with respect to the receivers is removed and a signal from a remaining source is extracted.

In various instances of the aforementioned embodiments, there is provided a method of extracting a signal by blind signal extraction, the method including:

receiving a convolutively-mixed signal through two or more receivers;

calculating a transfer function for demixing; and demixing the received convolutively-mixed signal using the calculated transfer function, wherein the transfer function is determined such that a signal from a source in a known direction with respect to the receivers is removed, and a signal from a remaining source is extracted.

Accordingly, it is possible to provide a method and apparatus capable of efficiently extracting a signal from a source in a specific direction from receivers or from a source closest to receivers.

BRIEF DESCRIPTION OF THE DRAWINGS

The above and other features of the present invention will become apparent from the following description of an embodiment given in conjunction with the accompanying drawings, in which.

DETAILED DESCRIPTION OF THE EMBODIMENTS

Hereinafter, embodiments of the invention will be described with reference to the accompanying drawings.

Figure 1:
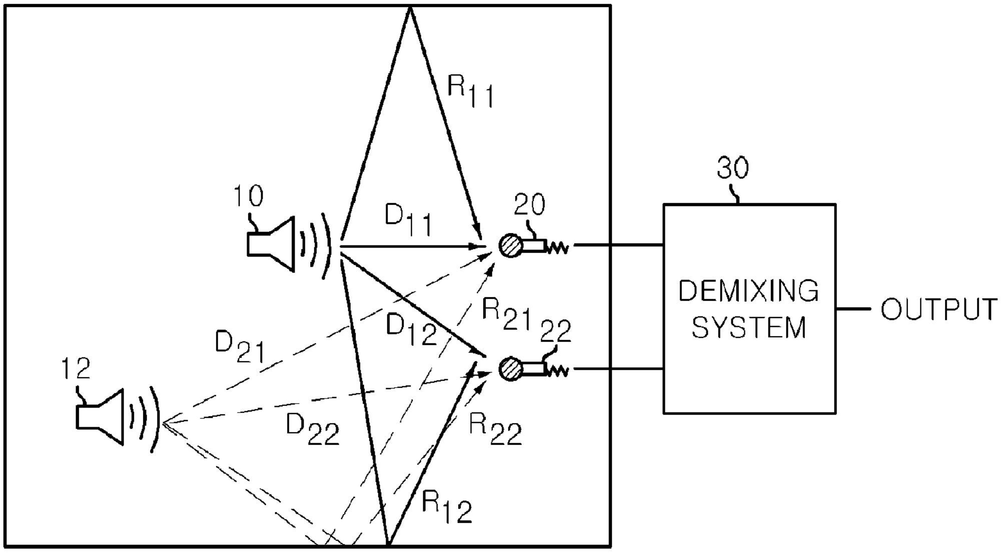
FIG. 1 is a diagram illustrating a demixing system in accordance with an embodiment of the invention.

FIG. 1 is a diagram illustrating a demixing system in accordance with an embodiment of the invention. As shown in FIG. 1, it is assumed that signals from two sources (for example, speakers 10 and 12) are received by one or more signal receivers (for example, microphones 20 and 22) indoors. The signals from the speakers 10 and 12 reach the microphone 20 through a direct path D, and are reverberated by the indoor wall and reach the microphone 20 through a reverberant path R. For example, the signal from the speaker 10 reaches the microphone 20 through a direct path $D_{11}$, and reaches the microphone 22 through a direct path $D_{12}$. The signal from the speaker 10 also reaches the microphone 20 through a reverberant path $R_{11}$, and reaches the microphone 22 through a reverberant path $R_{12}$. The same is applied to another speaker 12.

The signals received by the microphones 20 and 22 are input to a demixing system 30, and a desired signal is extracted by demixing in the demixing system 30. In the embodiment of the invention, the desired signal is selected on the basis of the directions from the microphones 20 and 22 or the distances from the microphones 20 and 22.

It may be assumed that the microphones 20 and 22 are substantially included in the demixing system 30 or that the receivers which receive signals from the microphones 20 and 22 are included in the demixing system 30. In the following description, unless otherwise stated, the demixing system 30 and the receivers 20 and 22 are not distinguished from each other.

Figure 2:
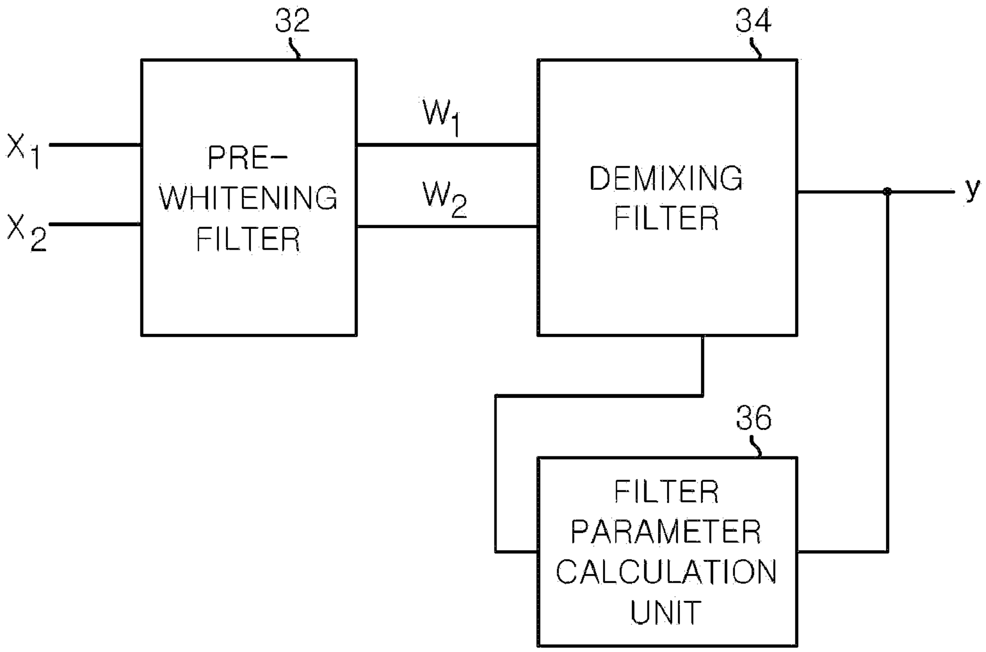
FIG. 2 is a block diagram of a demixing system in accordance with an embodiment of the invention.

FIG. 2 shows the block diagram of the demixing system 30 in accordance with an embodiment of the invention. As shown in FIG. 2, the demixing system 30 includes a pre-whitening filter 32, a demixing filter 34, and a filter parameter calculation unit 36. Specifically, signals $x_1$ and $x_2$ from the speakers are input to the pre-whitening filter 32. The signals $x_1$ and $x_2$ are substantially signals which are transmitted through a path from a speaker to a microphone, and may be regarded as signals which pass through a transfer function A of the path.

In the pre-whitening filter 32, pre-whitening is performed on the input signals $x_1$ and $x_2$ so as to prevent degradation in reliability of a subsequent process due to the correlation between the signals, and pre-whitened signals $w_1$ and $w_2$ are output. The pre-whitening filter 32 is configured to assist a subsequent process and may not be necessarily provided or may be incorporated in the demixing filter 34. Mathematically, the transfer function of the demixing filter 34 may be determined taking into consideration pre-whitening.

Next, the pre-whitened signals $w_1$ and $w_2$ are input to the demixing filter 34 and demixed, and one extracted signal y is output. Hereinafter, the transfer function of the demixing filter 34 is denoted by W. A vector which expresses the transfer function W of the demixing filter is denoted by w.

The demixing filter 34 is connected to the filter parameter calculation unit 36, and is supplied with the transfer function W of the filter or a filter parameter necessary for determining the transfer function, for example, the vector w. Hereinafter, filter parameter calculation in the filter parameter calculation unit 36 will be described. It should be noted that the filter parameter calculation unit 36 may not be a separate component or may be incorporated in the demixing filter 34.

Since the signal y extracted by the demixing filter 34 in the demixing system should be the same as a signal from a speaker, an original signal should be restored by multiplying an initial signal by the transfer function A of the path and multiplying the result by the transfer function W of the demixing filter 34. If this is expressed by a matrix, Equation 1 is obtained.

$$[\, W_1(z) \quad W_2(z) \,]\begin{bmatrix} A_{11}(z) & A_{12}(z) \\ A_{21}(z) & A_{22}(z) \end{bmatrix} = [\, 1 \quad 0 \,] \qquad \text{[Equation 1]}$$

Here, $W_1(z)$ is a z-domain expression of a transfer function for the input $x_1$ and the output y of the demixing system, and $W_2(z)$ is a z-domain expression of a transfer function for the input $x_2$ and the output y of the demixing system. $A_{1j}(z)$ is a z-domain expression of a transfer function of a path from a source (for example, a speaker) j to a receiver (for example, a microphone) i.

The inventors have devised a direction constraint and a closest constraint so as to determine the transfer function in Equation 2, that is, $W_1$ and $W_2$. Hereinafter, the direction constraint and the closest constraint will be described in detail.

Signal Extraction Based on Direction Constraint

Figure 3:
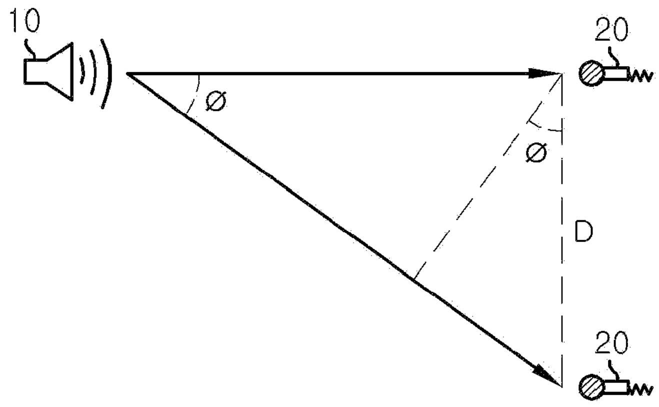
FIG. 3 is a diagram showing the configuration of a demixing system in accordance with another embodiment of the invention.

First, an embodiment of the invention which uses the direction constraint will be described. In this embodiment, a signal in a specific direction from two or more sources is removed, and a signal from a remaining source is extracted. To this end, as shown in FIG. 3, if it is assumed that a signal from a source in a direction at an angle ϕ from the microphone 20, that is, a signal from the speaker 10 is removed, as shown in FIG. 3, the difference in the distance between the speaker 10 to the two microphones 20 and 22 is defined as D sin(ϕ) (where D is the distance between the microphones). Accordingly, the difference $\tau_d$ in the time until the signals reach the two microphones is defined by Equation 2.

$$\tau_d = D(\sin\phi)/v \qquad \text{[Equation 2]}$$

Here, v denotes the speed of a signal.

At this time, when the time difference between the two signals is 0, the speaker 10 is at the same distance from the microphones 20 and 22, and this means that the speaker 10 is in front of the center point between the microphones 20 and 22. If the speaker 10 is on the right with respect to the center point between the microphones 20 and 22, ϕ is greater than 0, and the time different τd has a positive value. On the other hand, if the speaker 10 is on the left side with respect to the center point between the microphones 20 and 22, the time different τd has a negative value. As described above, the difference in the time until the signals reach includes information regarding the directions of the signals. Thus, if the directions of the signals are defined, the difference in the time until the signals reach is also defined. If Equation 2 is expressed by an index value in a series expression, ρ expressed by Equation 3 is obtained. Equation 3 expresses a difference in a time index of a component which represents a maximum value in a series representing a transfer function (that is, represents a transfer function of a direct path).

$$\begin{aligned} \rho_j &= (\sigma_{ij} - \sigma_{jj})_{i \neq j} \\ &= \arg\max_l [a_{ij}(l)] - \arg\max_l [a_{jj}(l)] \end{aligned} \qquad \text{[Equation 3]}$$

Equation 4 is obtained from the computation result of the second column in Equation 1, that is, from the condition that the transfer function is determined such that a signal other than a signal to be extracted becomes 0.

$$W_1(z)/W_2(z) = -A_{22}(z)/A_{12}(z) \qquad \text{[Equation 4]}$$

If Equation 4 is expressed in a frequency domain, Equations 5 and 6 are obtained. Equation 6 is a series expression of Equation 5.

$$\frac{W_2(e^{j\omega})}{W_1(e^{j\omega})} = -\frac{A_{12}(e^{-j\omega})}{A_{22}(e^{-j\omega})} \quad \text{[Equation 5]}$$

$$\frac{\sum_{m=0}^{L_a-1} w_2(m)e^{-j\omega m}}{\sum_{m=0}^{L_a-1} w_1(m)e^{-j\omega m}} = -\frac{\sum_{l=\sigma_{11}}^{L_m-1} a_{12}(l)e^{-j\omega l}}{\sum_{l=\sigma_{21}}^{L_m-1} a_{22}(l)e^{-j\omega l}} \quad \text{[Equation 6]}$$

In general, since a signal which passes through a direct path is significantly greater than a signal which passes through a reverberant path, if only a component which passes through a direct path is extracted in Equation 6, the following equation is obtained.

$$\frac{w_2(\xi_2)}{w_1(\xi_1)} \cdot e^{-j\omega(\xi_2-\xi_1)} \approx -\frac{a_{12}(\sigma_{12})}{a_{22}(\sigma_{22})} \cdot e^{-j\omega(\sigma_{12}-\sigma_{22})} \quad \text{[Equation 7]}$$

Here, σ and ξ are indexes of a transfer function for a signal which passes through a direct path. Accordingly, index differences $\xi_2$-$\xi_1$ and $\sigma_{12}$-$\sigma_{22}$ are respectively equal to the differences in a time index of a component passing through a direct path for the transfer functions W and A. As described in connection to Equation 2, if the direction (that is, ϕ) of a source is defined, the time difference can be known. Since the time difference is equal to the index difference of a signal which passes through a direct path, in Equation 7, $\xi_2$-$\xi_1$ and $\sigma_{12}$-$\sigma_{22}$ become a known value under the direction constraint, that is, ρ in Equation 3.

Accordingly, in this embodiment, after the vector w representing the transfer function W is initialized on the basis of the time delay, of Equation 2 or the difference in the time index of Equation 3, the vector w is adaptively computed to obtain a transfer function, and a signal is extracted using the transfer function. Thus, from the relationship of Equation 4, a signal from a source in a known direction can be removed, and only a remaining signal can be extracted. When adaptively calculating the vector w, various methods may be used. For example, the BSE method using a negentropy in the related art may be used. In order to exclude an unnecessary component, at the time of initialization, all components other than a component representing the time delay in the vector w can be set to 0. Therefore, it is possible to exclude a signal from a source in a specific direction (for example, the angle ϕ) and to extract a remaining signal.

Signal Extraction Based on Closest Constraint

Next, another embodiment of the invention which uses the closest constraint will be described. In this embodiment, if a first source is a desired source, and an equation for the first source in Equation 1 is taken into consideration, Equation 8 is established.

$$W_1(z)A_{11}(z)+W_2(z)A_{21}(z)=1 \quad \text{[Equation 8]}$$

As shown in FIG. 1, a signal from a source generally reaches a receiver through a direct path and a reverberant path. Accordingly, the signal received by the receiver includes a direct component and a reverberant component. The energy ratio of the direct component and the reverberant component is called DRR (Direct-to-Reverberant Ratio). For example, the DRR can be computed by Equation 9.

$$DRR(w) = w(k_{max})^2 \Big/ \sum_{k \neq k_{max}} w(k)^2 \quad \text{[Equation 9]}$$

Here, ω(k) represents a transfer function of a path, and $k_{max}$ represents an index k when ω(k) is the maximum. From Equation 9, the DRR for the transfer function ω can be regarded as the ratio of the maximum value $\omega_s(k_{max})^2$) and the sum $$\sum_{k \neq k_{max}} \omega_s(k)^2$$

of the remaining values in the transfer function. It can be understood that, as the DRR is large, the value of the transfer function at a specific index is significantly larger than other values.

The study of the inventors shows that, as shown in Table 1, the closer a signal to a receiver, the larger the DRR because the proportion of the direct component is high. As a signal is away from a receiver, the value of the DRR rapidly decreases. In other words, as a signal is closer to a source, the value of the transfer function at a specific index is significantly larger than the value of the transfer function at a different index.

TABLE 1

| Distance (m) | DRR |
|---|---|
| 0.5 | 14.42 |
| 1.0 | 2.70 |
| 1.5 | 0.88 |
| 2.0 | 0.32 |

Figure 4A:
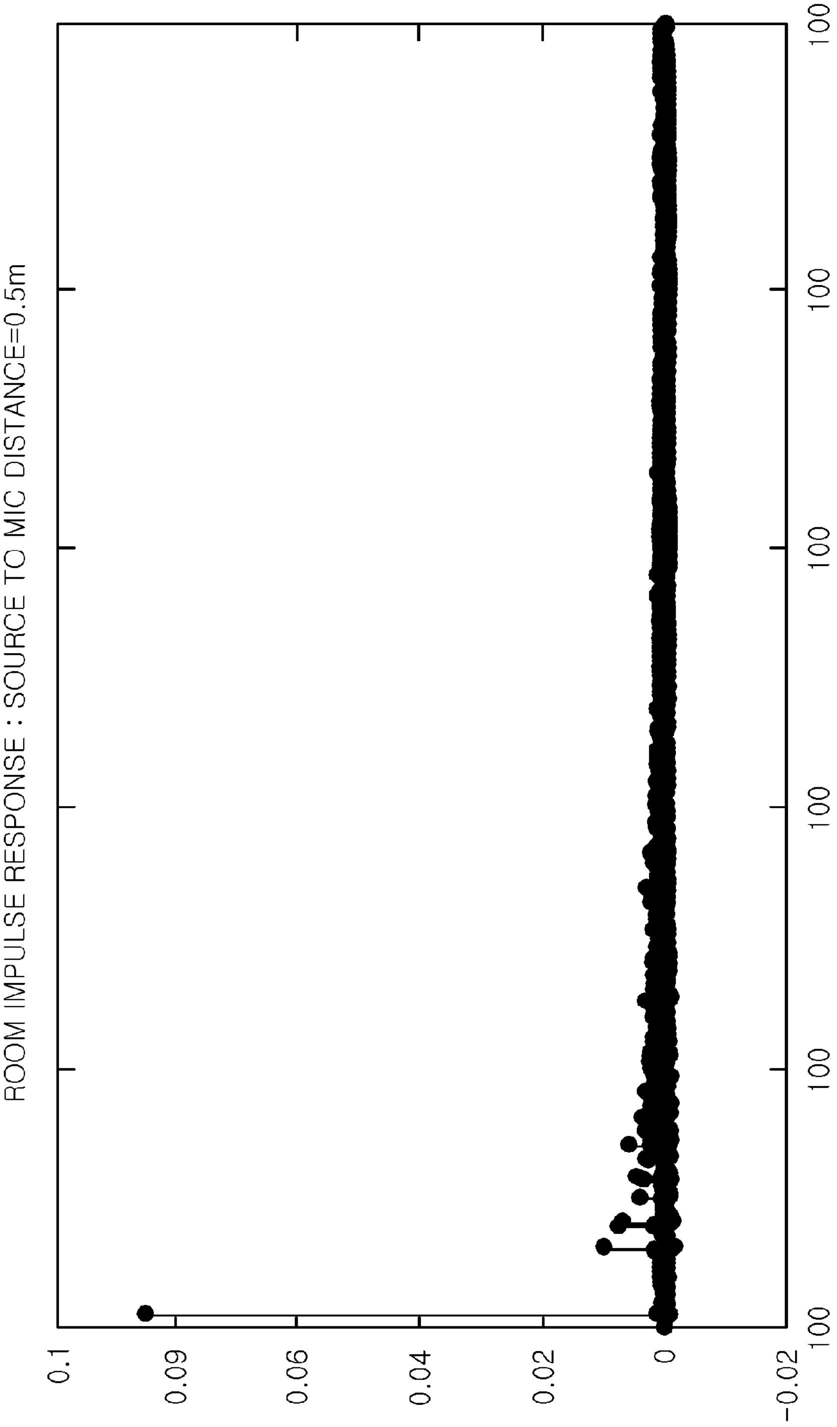
FIGS. 4A and 4B are graphs showing DRR depending on distance.
Figure 4B:
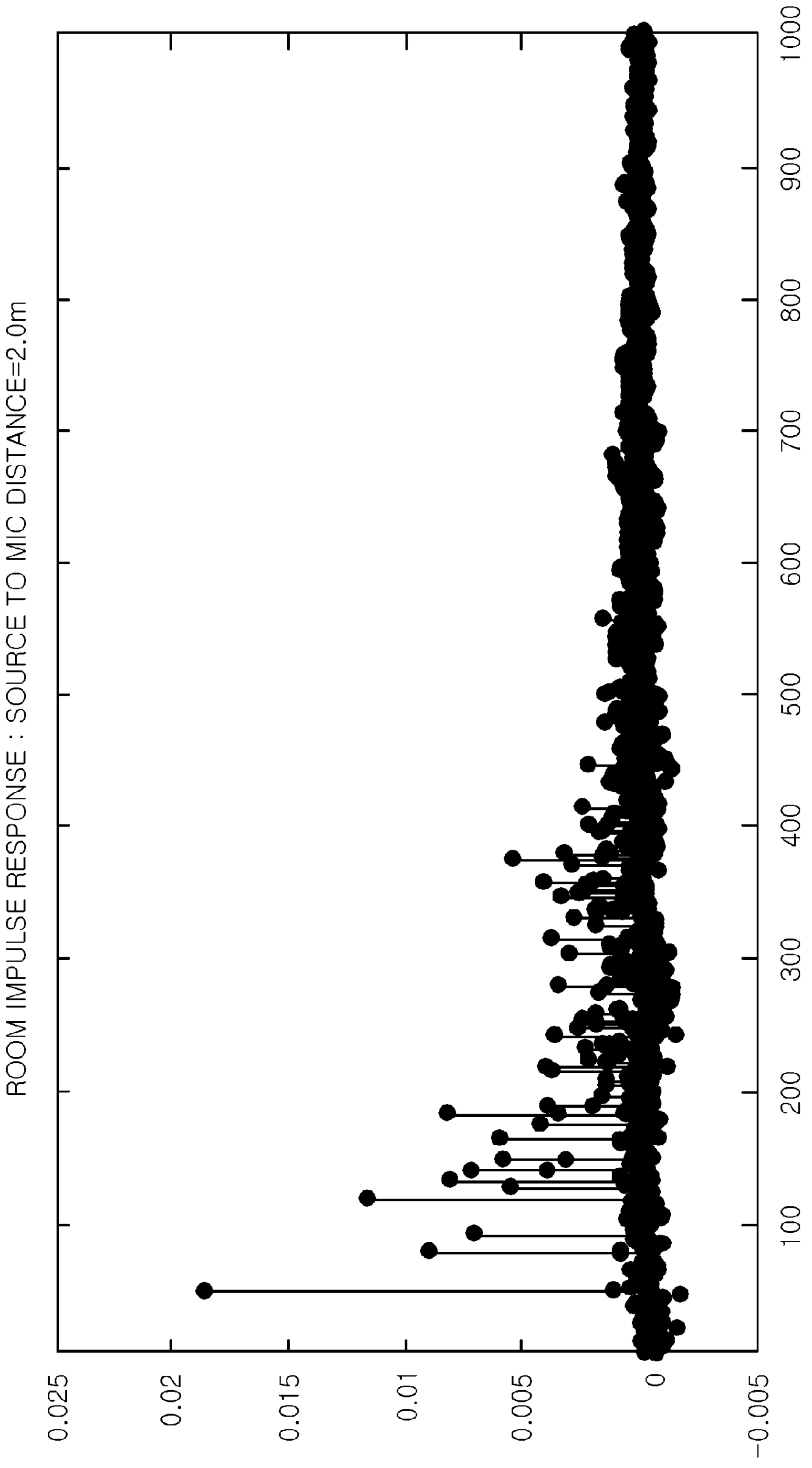

With this study, the inventors have found that, the closer a signal to a source, the transfer function 'A' of a path between a source and a receiver approaches a delta function. This can be confirmed from FIGS. 4A and 4B which respectively show an impulse response at a distance of 0.5 m and 2.0 m. Accordingly, it can be assumed that the transfer function A for a signal from the closet source, that is, $A_{11}$ in Equation 4 is a delta function.

On the other hand, it can be assumed without loss of generality that two receives, that is, the microphones 10 and 12 are close to each other, and the paths from a source, that is, the speaker, to the two receivers are different in distance but substantially have the same characteristics.

From the two assumptions that A11 is a delta function and A21 is the time delay version of A11, Equation 8 can be converted to Equation 10.

$$W_1(z)+z^{-\tau_d}W_2(z)\approx 1 \quad \text{[Equation 10]}$$

Here, $W_i$ is a z-transformed transfer function for an input i of the demixing means, and $\tau_d$ is a time delay due to the difference in the path from the closest source to the two receivers, and $a_{11}(\tau)\approx\delta(\tau)$ and $a_{21}(\tau)\approx\delta(\tau-\tau_d)$ are established. ($a_{11}$ and $a_{22}$ are respectively k-domain expressions of $A_{11}$ and $A_{21}$).

If Equation 10 is expressed in the k domain, Equation 11 can be obtained.

$$w_s(k)=w_1(k)+w_2(k-\tau_d)\approx\delta(k) \quad \text{[Equation 11]}$$

Finally, a cost function $J_C$ under the closet constraint can be defined by Equation 12 on the basis of Equation 11.

$$J_C(w) = w_s(k_{max})^2 - \sum_{k \neq k_{max}} w_s(k)^2 \quad \text{[Equation 12]}$$

Here, $w_1(k)$ and $w_2(k)$ are time-domain impulse responses which respectively correspond to $W_1(z)$ and $W_2(z)$ transfer functions, and $k_{max}$=argmax$_k$(|$\omega_s$(k)|).

The vector w when the cost function is the maximum is iteratively calculated, thereby obtaining the transfer function of the demixing filter and extracting the signal from the closest source. The term "iterative" means that calculation is performed again using the previous calculation results.

Cost Function Based on Negentropy

In an embodiment of the invention, the const function $J_C$ under the closet constraint may be taken into consideration together with a cost function $J_G$ for use in ICA (Independent Component Analysis). In ICA, the negentropy can be used for a cost function as a reference for maximizing a non-Gaussianity characteristic of a signal. This cost function is defined by Equation 13.

$$J_G(w)=[E(G(\tilde{y}(k)))-E(G(v(k)))]^2 \quad \text{[Equation 13]}$$

Here, $\tilde{y}(k)$ is an output signal, v(k) is a signal in the form of a Gaussian function having the same average and dispersion as $\tilde{y}(k)$, and G is a non-quadratic even function.

On the other hand, [ ] is an operator which represent an expectation, and can be implemented by a time average.

Taking into consideration the negentropy and the cost function under the closest constraint expressed by Equation 12 together, the following cost function is obtained.

$$J(w)=J_G(w)+\lambda J_C(w) \quad \text{[Equation 14]}$$

Here, λ is a constant.

The following learning rule is obtained using the cost function of Equation 14.

$$w = w + \eta\left[\frac{\partial J_G(w)}{\partial w} + \lambda\frac{\partial J_C(w)}{\partial w}\right] \quad \text{[Equation 15]}$$

Here, η is a learning rate.

In Equation 15, the derivatives $$\frac{\partial J_G(w)}{\partial w} \text{ and } \frac{\partial J_C(w)}{\partial w}$$

can be respectively obtained by differentiating Equations 12 and 13. For example, if Equation 12 is differentiated using Equation 11, the following equation is obtained.

$$\frac{\partial J_C(w)}{\partial w_1(k)} = \begin{cases} 2w_s(k_{max}), & \text{if } k = k_{max} \\ -2w_s(k), & \text{if } k \neq k_{max}; \end{cases} \quad \text{[Equation 16]}$$

$$\frac{\partial J_C(w)}{\partial w_2(k)} = \begin{cases} 2w_s(k_{max}), & \text{if } k = k_{max} - \tau_d \\ -2w_s(k+\tau_d), & \text{if } k \neq k_{max} - \tau_d \end{cases}$$

If Equation 13 is differentiated, the following equation is obtained.

$$\frac{\partial J_G(w)}{\partial w} = 2\gamma[E(\tilde{x}(k)g(w^T\tilde{x}(k)))] \quad \text{[Equation 17]}$$

Here, $\gamma = E(G(y(k))) - E(G(\upsilon(k)))$.

As described above, the filter parameter calculation unit 36 in accordance with an embodiment of the invention can obtain the vector w representing the demixing filter W using the direction constraint or the closest constraint. Specifically, when the direction constraint is used, the vector w is initialized on the basis of the time delay, and when the closet constraint is used, the vector w can be determined using the learning rule of Equation 15.

The filter parameter calculation unit 36 calculates the filter parameter and supplies the calculated filter parameter to the demixing filter 34. In particular, the filter parameter calculation unit 36 receives the output from the demixing filter 34, iteratively calculates the filter parameter on the basis of the output, and supplies the filter parameter to the demixing filter, such that the demixing filter 34 can be adaptively operated.

Signal Extraction Method

Figure 5:
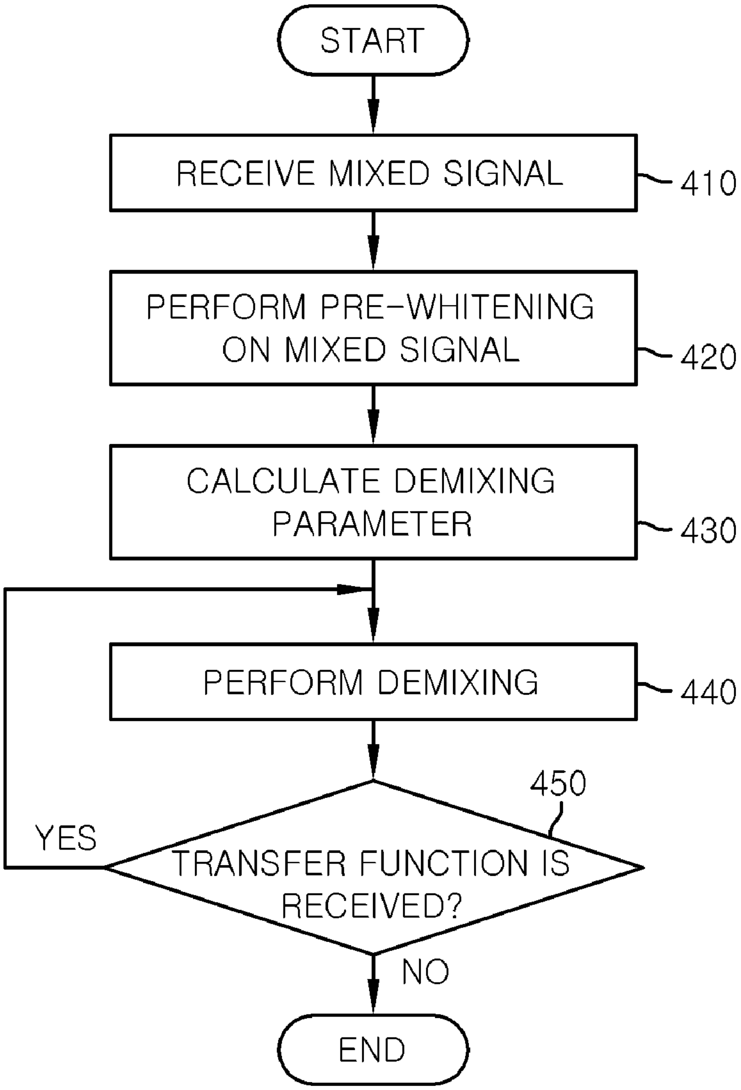
FIG. 5 is a flowchart illustrating a demixing method in accordance with an embodiment of the invention.

Next, a signal extraction method in accordance with an embodiment of the invention will be described with reference to FIG. 5.

In the method of this embodiment, first, in Step 410, a mixed signal in which signals from two or more sources are mixed is received. The mixed signal includes not only the signals from the two or more sources but also signals from the direct path and the reverberant path.

Next, in Step 420, pre-whitening is performed on the received signal, and a subsequent process is prepared. Step 420 is not necessarily performed, and may be incorporated in a subsequent step or may be removed.

Next, in Step 430, a demixing parameter is calculated for demixing the whitened (or received) signal to extract a signal from a desired source, that is, a signal from a source in a specific direction or the closest source.

In Step 430, in order to extract a signal from a source in a specific direction, the vector w which represents the transfer function of the demixing filter can be initialized on the basis of the time delay. In another embodiment, in order to extract a signal from the closest source, the transfer function W of the demixing filter is obtained using the cost function of Equation 8 and/or the cost function of Equation 10. The transfer function obtained in Step 430 may include whitening filtering corresponding to pre-whitening of Step 420. Alternatively, whitening may be performed in a separate step.

Next, the signal is demixed using the transfer function W calculated in Step 440 to extract a desired signal.

Here, the transfer function W can be adaptively obtained by iteratively performing calculation in accordance with, for example, the learning rule of Equation 11 or the like. In Step 450, it is determined whether or not the transfer function W converges. When the transfer function does not converge, the process returns to Step 430, the transfer function W is calculated again, and demixing is performed.

The method in accordance with the embodiment of the invention may be implemented as a program such that a machine, such as a computer can execute the method, and may be recorded in a machine-readable medium. Examples of the medium, not limited to, include a compact disk (CD), a magnetic disk, a magnetic tape, a ROM (Read Only Memory), a RAM (Random Access Memory), an optical disk, a flash disk, and the like. Examples of the medium include all mediums in which data can be recorded and read by a machine, such as a computer or a processor.

Figure 6:
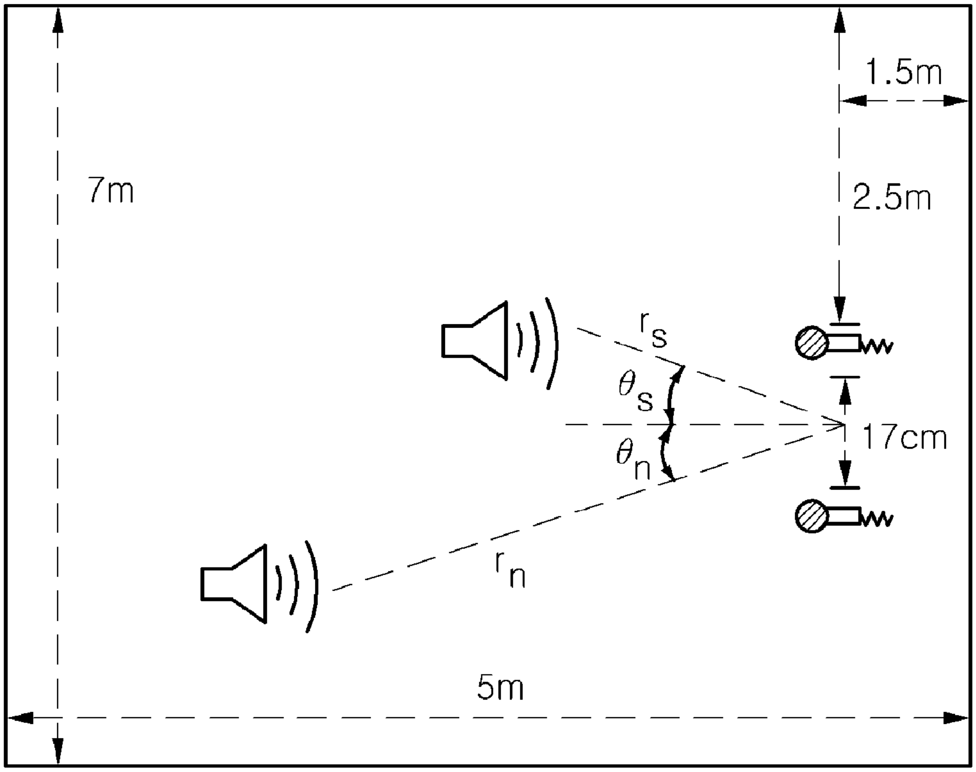
FIG. 6 is a diagram illustrating simulation conditions in an embodiment of the invention.

With regard to the demixing method in accordance with the embodiment of the invention, an experiment was conducted under the conditions of FIG. 6. Specifically, the size of a reverberation room was 7 m×5 m×3 m, and the microphones 20 and 22 were respectively disposed at distances of 1.5 m and 2.5 m from the wall. The distance between the microphones 20 and 22 was 17 cm, and the height of the room was 1.7 m. The position of the closest source was defined by polar coordinates ($r_s$, $\theta_s$) with respect to the center point between the microphones 20 and 22, and the polar coordinates of another source (that is, an interference source) were ($r_n$, $\theta_n$). Under the above-described conditions, the demixing result was measured as SIR (Signal-to-Interference Ratio) while changing SPR (Source Power Ratio) which represents signal intensity in a source. Specifically, the following equations are defined.

$$SPR = 10\log\left(\frac{\sum_k |s(k)|^2}{\sum_k |n(k)|^2}\right)$$

(s(k) is a signal from the closest source, and n(k) is a signal from an interference source)

$$SIR_x = 10\log\left(\frac{\sum_k |x_{i1}(k)|^2}{\sum_k |x_{i2}(k)|^2}\right)$$

($x_{ij}$(k) is a signal from a source j received by a microphone i)

$$SIR_y = 10\log\left(\frac{\sum_k |y_{11}(k)|^2}{\sum_k |y_{12}(k)|^2}\right)$$

($y_{ij}$(k) is a signal component from the source included in the output i)

Man's voice having a sampling rate of 8 kHz and a length of 6 seconds was used as a signal from a source, and the values of the learning rate ($\eta$) and the constant ($\lambda$) were respectively 0.0001 and 0.01. A reverberation time was set to 200 ms, and the reflection coefficient of the wall was 0.74.

An experiment was conducted using directionally constrained ICA (dcICA) under the same conditions.

As a comparison group, demixing was performed using the ICA of the related art under the same conditions.

The demixing results under the above-described conditions are shown in Table 2.

TABLE 2

| Position | | SPR | SIRx (dB) | | SIRy (dB) | | |
|---|---|---|---|---|---|---|---|
| ($r_s$, $\theta_s$°) | ($r_n$, $\theta_n$°) | (dB) | Microphone 1 | Microphone 2 | ICA | dcICA | ccICA |
| (0.5 m, 0°) | (1.0 m, −60°) | 0 | 4.6 | 5.2 | 21.8 | 22.2 | 18.2 |
| | | −7.8 | −2.3 | −1.6 | −18.2 | 11.3 | 15.3 |
| | | −12.5 | −6.4 | −5.7 | −19.9 | 10.0 | 11.5 |
| | | −14.8 | −8.3 | −7.6 | −22.0 | 6.4 | 9.4 |
| | | −16.9 | −9.3 | −9.6 | −22.5 | −4.5 | 8.5 |
| (0.5 m, 0°) | (1.0 m, −60°) | −12.5 | −6.4 | −5.7 | −19.9 | 10.0 | 11.5 |
| | (1.0 m, −30°) | −13.1 | −6.3 | −5.7 | −19.1 | 8.2 | 9.2 |
| | (1.0 m, −15°) | −13.1 | −6.3 | −5.8 | −15.6 | −3.7 | 4.7 |
| | (1.0 m, 15°) | −12.9 | −5.9 | −6.1 | −13.8 | −4.3 | 3.3 |
| | (1.0 m, 30°) | −13.1 | −6.3 | −5.7 | −19.1 | 5.6 | 7.6 |
| | (1.0 m, 60°) | −12.5 | −6.4 | −5.7 | −19.9 | 6.8 | 10.8 |
| (0.5 m, −60°) | (1.0 m, 0°) | −13.7 | −4.9 | −7.3 | −14.4 | 11.9 | 13.9 |
| (0.5 m, −30°) | | −13.3 | −5.3 | −6.8 | −21.3 | 9.2 | 11.2 |
| (0.5 m, −15°) | | −13.1 | −5.6 | −6.5 | −4.8 | −5.5 | 6.5 |
| (0.5 m, 15°) | | −13.1 | −6.3 | −5.8 | −8.7 | −6.7 | 4.7 |
| (0.5 m, 30°) | | −13.3 | −6.5 | −5.5 | −20.3 | 6.5 | 9.5 |
| (0.5 m, 60°) | | −13.6 | −7.1 | −5.0 | −23.5 | 9.8 | 13.8 |
| (0.5 m, 0°) | (0.6 m, −60°) | −6.7 | −5.6 | −3.4 | −17.3 | −5.2 | 12.8 |
| (0.5 m, −30°) | (0.6 m, 30°) | −6.8 | −3.2 | −5.8 | −8.3 | 5.3 | 14.4 |
| (1.0 m, 0°) | (2.0 m, −60°) | −9.4 | −4.7 | −4.2 | −8.7 | 7.9 | 6.9 |
| (1.0 m, 0°) | (2.0 m, 15°) | −9.4 | −4.3 | −4.6 | −10.9 | −6.9 | 8.6 |
| (1.0 m, 0°) | (1.1 m, −60°) | −5.3 | −4.8 | −4.1 | −13.5 | −10.7 | 9.1 |

From Table 2, in most cases, it can be confirmed that the SIR of a signal extracted by ICA is lower than the SIR of a signal obtained by the method using the closest constraint, that is, ccICA (closest constraint ICA) or the method using the distance constraint, that is, dcICA in accordance with the embodiment of the invention. Therefore, it can be confirmed that blind signal extraction by ccICA and dcICA achieve a more excellent result.

While the invention has been shown and described with respect to the embodiment, it will be understood by those skilled in the art that various changes and modifications may be made without departing from the scope of the invention as defined in the following claims.

The functional blocks or means described in this specification may be implemented using various known devices, such as electronic circuits, integrated circuits, and application specific integrated circuits (ASICs), and they may be separately implemented or at least two of them may be incorporated. The components described as separate means in this specification and the claims may be simply functionally separated and may be physically implemented as a single means. A component described as a single means may be implemented as a combination of several components. Also, it should be noted that, although the method described herein has been described with a specific number and sequence of steps, the sequence thereof may be altered while other steps may be added without departing from the scope of the invention.

Various embodiments described herein may be implemented separately or in any suitable combination. Therefore, the scope of the invention should not be limited to the above-described embodiments, but defined by the appended claims and equivalents thereof.

What is claimed is:

1. An apparatus for extracting a signal from convolutive mixtures, the apparatus comprising:

a receiving unit which includes two or more receivers and receives a convolutively-mixed signal;

a transfer function calculation unit which calculates a transfer function for demixing; and a demixing unit which demixes the received convolutively-mixed signal using the calculated transfer function, wherein the transfer function is determined such that a signal is extracted from a source closest to the receivers, and is calculated on the basis of a transfer function for a path to each receiver being approximated to a delta function as closer to the source.

2. The apparatus of claim 1, wherein the transfer function is calculated on the basis of the following equation, $$W_1(z)+z^{-\tau_d}W_2(z)\approx 1$$

where $W_i$ is a z-transformed transfer function for an input i of the demixing means, and $\tau_d$ is a time delay due to the difference in the path from the closest source to the two receivers.

3. The apparatus of claim 1, wherein the transfer function calculation unit iteratively calculates the transfer function using the following cost function, $$J_C(w) = w_s(k_{max})^2 - \sum_{k\neq k_{max}} w_s(k)^2$$

where $w_s(k)=w_1(k)+w_2(k-\tau_d)\approx\delta(k)$, $k_{max}=\arg\max_k(|w_s(k)|)$, and $w_1(k)$ and $w_2(k)$ are time-domain impulse responses which respectively correspond to $W_1(z)$ and $W_2(z)$ transfer functions.

4. The apparatus of claim 3, wherein the transfer function calculation unit iteratively calculates the transfer function on the basis of the following cost function, $$J(w)=J_G(w)+\lambda J_C(w)$$

where $J_G(w)$ is a function which represents the negentropy of an output signal, and $\lambda$ is a constant.

5. The apparatus of claim 4, wherein the transfer function calculation unit iteratively calculates the transfer function on the basis of the following learning rule, $$w = w + \eta\left[\frac{\partial J_G(w)}{\partial w} + \lambda\frac{\partial J_C(w)}{\partial w}\right]$$

where $\eta$ is a learning rate.

6. The apparatus of claim 1, further comprising:

a pre-whitening unit which pre-whitens the signal.

7. A method of extracting a signal by blind signal extraction, the method comprising:

receiving a convolutively-mixed signal through two or more receivers;

calculating a transfer function for demixing; and demixing the received convolutively-mixed signal using the calculated transfer function, wherein the transfer function is determined such that a signal is extracted from a source closest to the receivers, and is calculated on the basis of a transfer function for a path to each receiver being approximated to a delta function as closer to the source.

8. The method of claim 7, wherein the transfer function is calculated by the following equation, $$W_1(z)+z^{-\tau_d}W_2(z)\approx 1$$

where $W_i$ is a transfer function for an input i of a demixing unit which demixes the signal, and $\tau_d$ is a time delay due to the difference in the path from the closest source to the two receivers.

9. The method of claim 7, wherein, in said calculating the transfer function, the transfer function is iteratively calculated using the following cost function, $$J_C(w) = w_s(k_{max})^2 - \sum_{k\neq k_{max}} w_s(k)^2$$

where $w_s(k)=w_1(k)+w_2(k-\tau_d)\approx\delta(k)$, $k_{max}=\arg\max_k(|w_s(k)|)$, and $\omega_1$ and $\omega_2$ and are vectors which respectively represent $W_1$ and $W_2$.

10. The method of claim 9, wherein, in said calculating the transfer function, the transfer function is iteratively calculated on the basis of the following cost function, $$J(w)=J_G(w)+\lambda J_C(w)$$

where $J_G(w)$ is a function which represents the negentropy of an output signal, and $\lambda$ is a constant.

11. The method of claim 10, wherein, in said calculating the transfer function, the transfer function is iteratively calculated on the basis of the following learning rule, $$w = w + \eta\left[\frac{\partial J_G(w)}{\partial w} + \lambda\frac{\partial J_C(w)}{\partial w}\right]$$

where $\eta$ is a learning rate.

12. The method of claim 7, further comprising:

pre-whitening the signal.

13. An apparatus for extracting a signal from convolutive mixtures, the apparatus comprising:

a receiving unit which includes two or more receivers and receives a signal;

a transfer function calculation unit which calculates a transfer function for demixing; and a demixing unit which demixes the received signal using the calculated transfer function, wherein the transfer function is determined such that a signal from a source in a known direction with respect to the receivers is removed and a signal from a remaining source is extracted.

14. The apparatus of claim 13, wherein the transfer function is initialized a known time delay corresponding to the known direction.

15. The method of claim 14, wherein the known time delay corresponds to the difference in a time index between components corresponding to a direct path in a transfer function from a source in the known direction and the two or more receivers.

16. The apparatus of claim 13, wherein the transfer function is initialized such that components other than the time delay in a vector w representing the transfer function are set to 0.

17. A method of extracting a signal by blind signal extraction, the method comprising:

receiving a convolutively-mixed signal through two or more receivers;

calculating a transfer function for demixing; and demixing the received convolutively-mixed signal using the calculated transfer function, wherein the transfer function is determined such that a signal from a source in a known direction with respect to the receivers is removed, and a signal from a remaining source is extracted.

18. The method of claim 17, wherein the transfer function is initialized on the basis of a known time delay corresponding to the known direction.

19. The method of claim 18, wherein the known time delay corresponds to the difference in a time index between components corresponding to a direct path in a transfer function from a source in the known direction and the two or more receivers.

20. The method of claim 17, wherein the transfer function is initialized such that components other than the time delay in a vector w representing the transfer function are set to 0.

* * * * *